Aug. 1, 1939.     R. E. LYFORD     2,167,663
REFRIGERATION
Filed May 8, 1937     2 Sheets-Sheet 1

INVENTOR.
Robert E. Lyford
BY
D. E. Heath
his ATTORNEY.

Patented Aug. 1, 1939

2,167,663

UNITED STATES PATENT OFFICE 2,167,663

REFRIGERATION

Robert E. Lyford, Torrington, Conn., assignor to Servel, Inc., New York, N. Y., a corporation of Delaware Application May 8, 1937, Serial No. 141,413

15 Claims. (Cl. 62—119.5)

My invention relates to refrigeration and more particularly to a refrigeration system employing evaporation of refrigerant fluid in the presence of inert gas.

It is an object of the invention to provide improved gas and liquid circulation and heat transfer for effecting a lower mean evaporator temperature.

The invention, together with the objects and advantages thereof, is set forth with particularity in the following description and the accompanying drawings forming part of this specification and of which:

Figure 1:
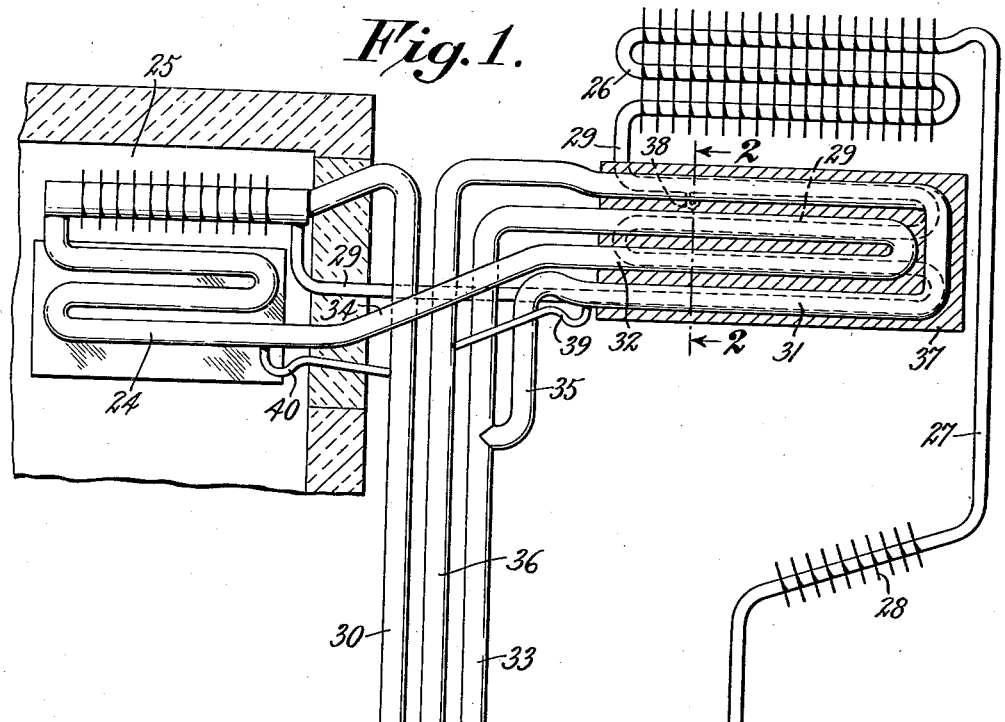
Fig. 1 is a more or less diagrammatic view of a refrigeration system embodying the invention.
Figure 2:
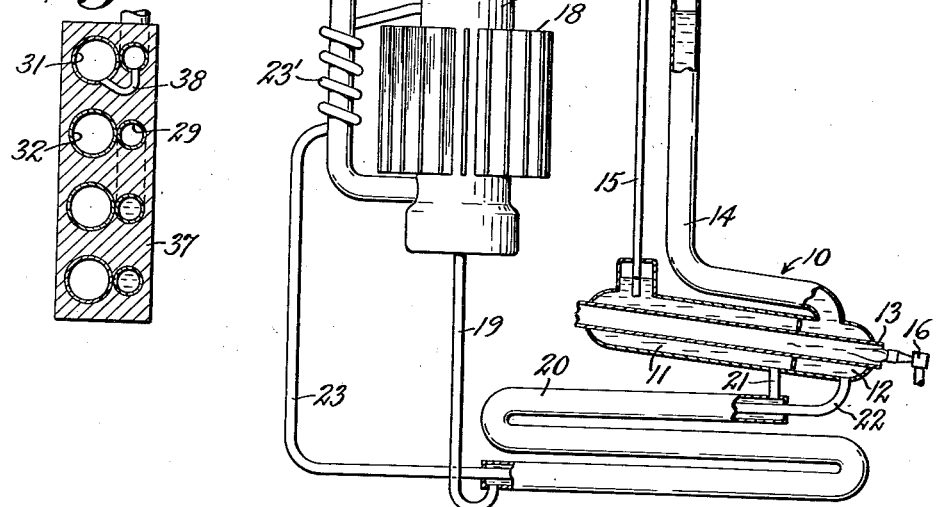
Fig. 2 is a detail sectional view taken on line 2—2 in Fig. 1.

Referring to Figs. 1 and 2 of the drawings, there is shown a refrigeration system of an equalized pressure type generally like that described in United States Patent No. 1,609,334 to Von Platen and Munters. A generator 10 comprises a horizontal portion having a chamber 11 and a chamber 12. A flue 13 extends through these chambers. A standpipe 14 is connected at its lower end to chamber 12. A vapor liquid lift conduit 15 communicates from within chamber 11 to the upper part of the standpipe 14. A gas burner 16 for heating the generator is arranged so that its flame is projected into the lower end of the flue 13. The generator may be heated by any other suitable means.

An absorber 17 is provided with heat radiating fins 18 for air cooling. The absorber may be cooled in any other suitable manner, as by water or a secondary vaporization-condensation heat transfer system. The lower part of the absorber 17 is connected by a conduit 19, the outer passage of a liquid heat exchanger 20 and conduit 21 to chamber 11 of the generator. Chamber 12 of the generator is connected by a conduit 22, the inner passage of the liquid heat exchanger 20 and conduit 23 to the upper part of the absorber 17. A cooling element or evaporator 24 is shown as a pipe coil located in a thermally insulated refrigerator compartment 25. An air cooled condenser 26 is connected to the generator 10 by a conduit 27. A portion of the conduit 27 is provided with heat radiation fins 28 and acts as a rectifier. The condenser 26 is connected to the upper part of the evaporator 24 by a conduit 29, a portion of which is formed as a flat coil.

The upper part of the evaporator 24 is connected by a conduit 30 to the lower part of the absorber 17. Conduit 23 has a portion 23' coiled around the lower end of conduit 30. Alongside of the flat coil portion of conduit 29 are a pipe loop 31 and a second pipe loop 32. The upper part of absorber 17 is connected by a conduit 33 to the upper end of pipe loop 32 and the lower end of this loop is connected by a conduit 34 to the lower end of the evaporator 24. One end of a branch conduit 35 is connected to conduit 33 and the other end of conduit 35 is connected to the lower end of the loop 31. The other end of loop 31 is connected by a conduit 36 to conduit 30. The flat loops 29, 31 and 32 are arranged in good thermal exchange relation as by embedding these loops in a block 37 of good thermal conducting material such as cast aluminum. A small conduit 38 has one end connected to the upper part of loop 29 and the other end connected to the upper part of loop 31. Conduit 38 is small and is looped downwardly to form a liquid trap seal. A liquid drain conduit 39 is connected from the lower end of loop 31 to conduit 36 and another liquid drain conduit 40 is connected from the lower end of evaporator 24 to conduit 30.

The above described system contains a refrigerant fluid such as ammonia, an absorption liquid such as water, and an inert gas such as hydrogen. In the generator 10, ammonia vapor is expelled from solution by heating. The ammonia vapor flows through conduit 27 into the condenser 26. Water vapor is condensed out of the ammonia vapor in the rectifier 28, and the ammonia vapor is condensed to liquid in the condenser 26. Liquid ammonia flows from condenser 26 through conduit 29 into the upper part of the evaporator 24. Liquid ammonia flows downward in the evaporator 24 and evaporates and diffuses into the hydrogen, producing a refrigerating effect in the refrigerator storage compartment 25.

Hydrogen enters the lower end of the evaporator 24 through conduit 34. Rich gas flows from the upper end of evaporator 24 through conduit 30 to the lower part of the absorber 17.

Weakened absorption solution flows from the generator 10 through conduit 22, the inner passage of the liquid heat exchanger 20, and conduit 23 into the upper part of the absorber 17. In the absorber, weakened absorption solution absorbs ammonia vapor out of the inert gas. Enriched absorption solution flows through conduit 19, the outer passage of liquid heat exchanger 20, and conduit 21 to chamber 11 of the generator. Solution is raised from chamber 11 of the generator through the vapor lift conduit 15 into the upper end of the standpipe 14 to provide a head of liquid for causing circulation of the solution between the generator and absorber.

Weak gas flows from the upper part of the absorber 17 through conduit 33, pipe coil 32 and conduit 34 to the lower end of the evaporator 24. Weak gas also flows through conduit 35 to the pipe loop 31. Some liquid ammonia flows from conduit 29 through the liquid trap conduit 38 into the upper end of the pipe loop 31. This liquid ammonia flows downwardly in conduit 31 and evaporates and diffuses into the weak gas in this conduit. Enriched gas flows from the upper end of conduit 31 through conduit 36 and conduit 30 back to the absorber.

Unevaporated liquid flows from the lower end of evaporator 24 through conduit 40 into the conduit 30, and unevaporated liquid flows from the lower end of the pipe loop 31 into conduit 36 through conduit 39. Conduits 30 and 36 conduct rich gas back to the absorber and also unevaporated liquid from the evaporator 24 and pipe loop 31.

The pipe loop 31 constitutes an evaporator and is in a circuit for gas which includes the absorber 17 but excludes the evaporator 24. Conduit 29 and pipe loop 32 are both in thermal exchange relation with the evaporator 31 so that liquid ammonia flowing through conduit 29 and weak gas flowing in conduit 32 are cooled by the evaporator 31. The liquid ammonia and weak gas flowing respectively in conduits 29 and 32 are conducted to the evaporator 24. The cooling of weak gas in conduit 32 by the evaporator 31 permits weak gas to enter the lower end of the evaporator 24 at a lower temperature so that the mean temperature of the evaporator 24 is lower. The evaporator 24 may be referred to as a low temperature evaporator, and the evaporator 31 may be referred to as a high temperature evaporator or precooler. Although not shown, various parts of the system should be enclosed in thermal insulation material for conservation of heat. The generator 10 and liquid heat exchanger 20 should be insulated and the gas conduits or portions thereof operating below room temperature should also be insulated. This includes the heat exchanger formed by conduits 29, 31 and 32 in the casting 37. The coil portion 23' of conduit 23 is located around the lower end of the rich gas conduit 30 to effect some transfer of heat between the weak absorption liquid flowing to the absorber and the cooler gas from the evaporator.

Figure 3:
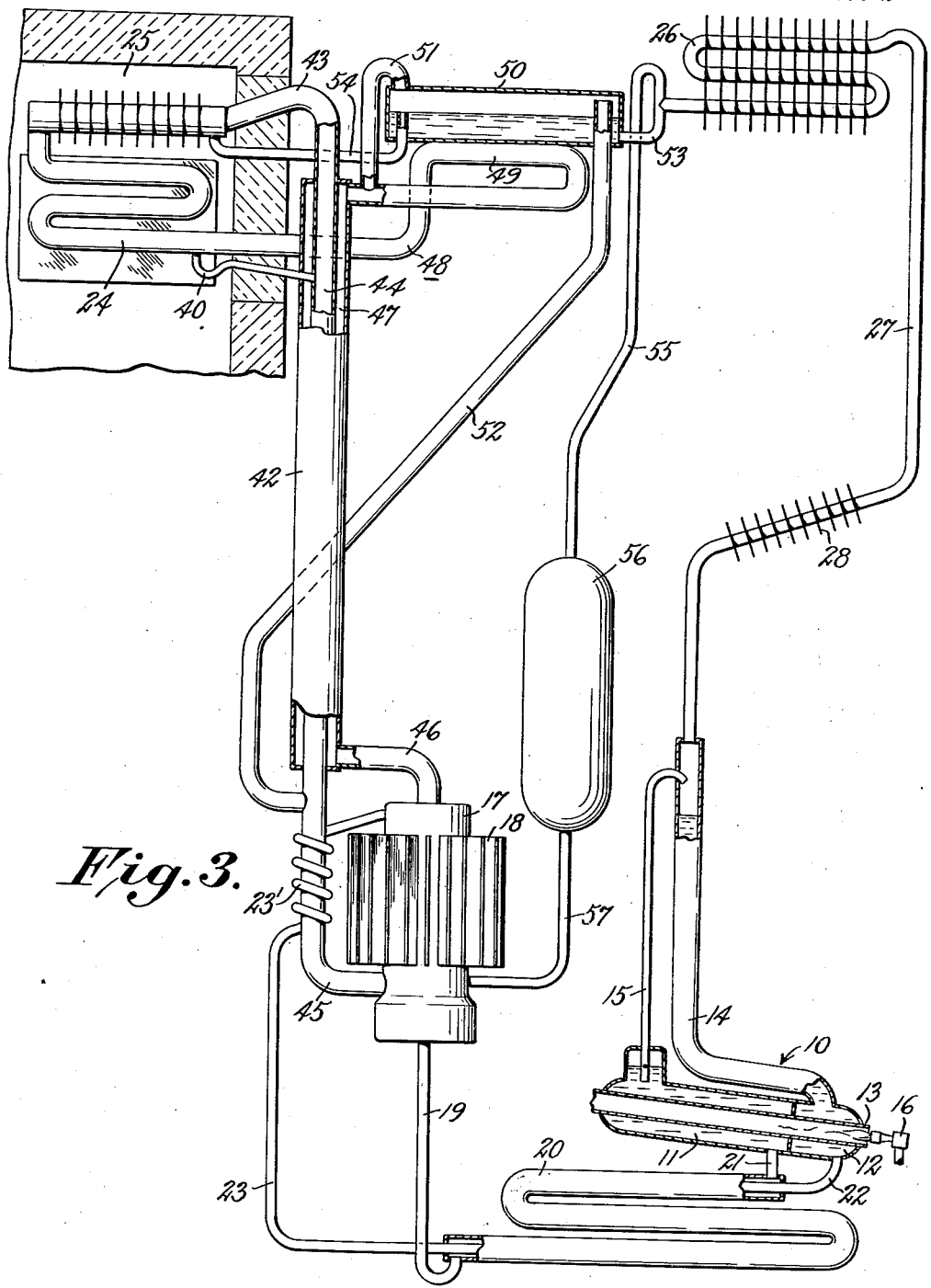
Fig. 3 is a more or less diagrammatic view of a refrigeration system illustrating a modification of the invention.

In Fig. 3 is shown a modification of the previously described system in which modification the liquid ammonia is precooled by evaporation in the presence of inert gas rather than by indirect heat exchange. Identical parts in Figs. 1 and 3 have the same reference numerals. The evaporator 24 and the absorber 17 are interconnected through a gas heat exchanger 42. The upper end of the evaporator 24 is connected by a conduit 43, the inner passage 44 of the gas heat exchanger, and conduit 45 to the lower part of the absorber 17. The upper part of the absorber is connected by a conduit 46, the outer passage 47 of the gas heat exchanger, and conduit 48 to the lower end of the evaporator 24. Conduit 48 has a portion 49 in thermal contact with a vessel 50.

One end of a conduit 51 is connected to the upper part of vessel 50 and the other end of conduit 51 is connected to a conduit 48. One end of a conduit 52 is connected to conduit 45 and the other end of conduit 52 is connected to the upper part of vessel 50. Conduits 51 and 52 communicate with opposite ends of the vessel 50. The lower end of the condenser 26 is connected by a conduit 53 to one end of the vessel 50. The other end of the vessel 50 is connected by a conduit 54 to the upper end of the evaporator 24. Conduit 54 is connected to vessel 50 so as to communicate with the interior of this vessel at a point intermediate the top and bottom of this vessel. The lower end of the condenser 26 is also connected by a conduit 55, a vessel 56 and a conduit 57 to the absorber 17.

In operation of this system, ammonia vapor expelled from solution by heat in the generator 10 flows through the conduit 27 to the condenser 26. The ammonia vapor is condensed to liquid in the condenser and the liquid flows from the lower end of the condenser through conduit 53 into vessel 50. Liquid ammonia accumulates in vessel 50 until it reaches the point of overflow into conduit 54 through which the liquid ammonia flows to the evaporator 24. In the evaporator 24, liquid ammonia evaporates and diffuses into inert gas, producing a refrigerating effect in the refrigerator compartment 25. Rich gas flows from the upper end of the evaporator 24 through conduit 43, the gas heat exchanger 42, and conduit 45 to the absorber. Weak gas flows from the absorber through conduit 46, the gas heat exchanger 42 and conduit 48 to the lower end of the evaporator 24. Liquid circulation between the generator 10 and the absorber 17 is the same as described in connection with Fig. 1. Weak gas also flows through conduit 51 into vessel 50 so that this vessel is filled with inert gas above the level of liquid ammonia therein. In vessel 50, liquid ammonia evaporates into the gas, producing a cooling of the liquid ammonia flowing through this vessel on its way from the condenser to the evaporator. Enriched gas flows from vessel 50 through conduit 52 and conduit 45 back to the absorber. Gas which flows through vessel 50 does not flow through the evaporator 24 since vessel 50 and the evaporator 24 are in separate gas circuits. The absorber 17 is in both gas circuits. Weak gas flowing through conduit 48 is cooled by heat transfer to vessel 50. Vessel 50 may be referred to as a high temperature evaporator or precooler. Due to evaporation of refrigerant fluid in this vessel there is effected cooling of both the liquid and weak gas flowing to the evaporator so that fluids entering the evaporator 24 are at a lower temperature, producing a lower mean temperature of evaporator 24.

Vessel 56 provides a reserve space for inert gas which is displaced from this vessel into the gas circuit by uncondensed ammonia vapor flowing from the condenser 26 through conduit 55. When the temperature of condenser 26 rises above the temperature at which complete condensation takes place in the condenser the displacement of inert gas in the gas circuit effects an increase in total pressure in the system so that the condensation pressure of ammonia is effected for the increased temperature.

Various changes and modifications may be made within the scope of the invention which is not limited as set forth in the foregoing part of the specification or as shown in the drawings but only as indicated in the following claims.

What I claim is:

1. A refrigeration system including a plurality of evaporators, an absorber, a condenser, a generator, members interconnecting said absorber and one of said evaporators for circulation of inert gas therethrough and therebetween, further members forming a path of flow for gas through another of said evaporators, said generator being interconnected with said absorber for circulation of absorption liquid therethrough and therebetween, said condenser being connected to receive vaporous refrigerant fluid from said generator, and members for conducting liquid refrigerant fluid from said condenser to said evaporators, one of said first members being in thermal exchange relation with said second evaporator for heat transfer to said evaporator from gas flowing from said absorber to said first evaporator.

2. In a refrigeration system utilizing evaporation of refrigerant fluid in the presence of inert gas, a plurality of evaporators, an absorber, members for circulation of gas from said absorber through said evaporators in parallel and arranged so that gas flowing to one of said evaporators passes in thermal exchange relation with another of said evaporators, and conduits for conducting liquid refrigerant fluid to said evaporators.

3. In a refrigeration system utilizing evaporation of refrigerant fluid in the presence of inert gas, a plurality of evaporators, an absorber, members for circulation of gas from said absorber through said evaporators in parallel and arranged so that gas flowing to one of said evaporators passes in thermal exchange relation with another of said evaporators, a conduit for conducting liquid to said second evaporator, and a conduit for conducting liquid to said first evaporator in thermal exchange relation with said second evaporator.

4. In a refrigeration system utilizing evaporation of refrigerant fluid in the presence of inert gas, a plurality of evaporators, an absorber, members for circulation of gas from said absorber through said evaporators in parallel and arranged so that gas flowing to one of said evaporators passes in thermal exchange relation with another of said evaporators, and conduits for conducting liquid to said second evaporator and from said second evaporator to said first evaporator.

5. In a refrigeration system employing evaporation of liquid refrigerant fluid in the presence of inert gas, a first circuit for gas including an evaporator and an absorber, a second circuit for gas including said absorber and a second evaporator, a portion of said first circuit being in thermal exchange relation with said second evaporator for heat transfer to said second evaporator from gas flowing to said first evaporator, and conduits for conducting liquid refrigerant fluid to said evaporators.

6. In a refrigeration system employing evaporation of liquid refrigerant fluid in the presence of inert gas, a first circuit for gas including an evaporator and an absorber, a second circuit for gas including said absorber and a second evaporator, a portion of said first circuit being in thermal exchange relation with said second evaporator for heat transfer to said second evaporator from gas flowing to said first evaporator, and conduits for conducting liquid refrigerant fluid to said second evaporator and from said second evaporator to said first evaporator.

7. In a refrigeration system employing evaporation of liquid refrigerant fluid in the presence of inert gas, a first circuit for gas including an evaporator and an absorber, a second circuit for gas including said absorber and a second evaporator, a portion of said first circuit being in thermal exchange relation with said second evaporator for heat transfer to said second evaporator from gas flowing to said first evaporator, a conduit for conducting liquid refrigerant fluid to said second evaporator, and a conduit for conducting liquid refrigerant fluid to said first evaporator in thermal exchange relation with said second evaporator.

8. In a method of refrigeration making use of evaporation of refrigerant fluid in the presence of inert gas, that improvement which resides in flowing gas from a place of absorption to a plurality of places of evaporation in parallel, conducting the gas to one of said places of evaporation in thermal exchange relation with another of said places of evaporation, conducting liquid refrigerant fluid to said second place of evaporation and from said second place of evaporation to said first place of evaporation.

9. In a method of refrigeration making use of evaporation of refrigerant fluid in the presence of inert gas, that improvement which resides in flowing gas from a place of absorption to a plurality of places of evaporation in parallel, conducting the gas to one of said places of evaporation in thermal exchange relation with another of said places of evaporation, conducting liquid refrigerant to said second place of evaporation, and conducting liquid refrigerant to said first place of evaporation in thermal exchange relation with said second place of evaporation.

10. In a method of refrigeration by evaporation of liquid refrigerant fluid in the presence of inert gas in a plurality of places of evaporation, that improvement which resides in conducting inert gas in separate paths to said places of evaporation, conducting the inert gas to one of said places of evaporation in thermal exchange relation with another of said places of evaporation, and conducting liquid refrigerant fluid to said second place of evaporation and from said second place of evaporation to said first place of evaporation.

11. In a method of refrigeration by evaporation of liquid refrigerant fluid in the presence of inert gas in a plurality of places of evaporation, that improvement which resides in conducting inert gas in separate paths to said places of evaporation, conducting the inert gas to one of said places of evaporation in thermal exchange relation with another of said places of evaporation, conducting liquid refrigerant fluid to said second place of evaporation, and conducting liquid refrigerant fluid to said first place of evaporation in thermal exchange relation with said second place of evaporation.

12. In a method of refrigeration which includes evaporation of refrigerant fluid in the presence of inert gas in a place of evaporation and absorption of refrigerant fluid out of inert gas into an absorbent in a place of absorption, that improvement which resides in conducting liquid refrigerant fluid to a second place of evaporation, flowing gas from a place of absorption into the presence of liquid in said second place of evaporation, and conducting gas from said place of absorption to said first place of evaporation in thermal exchange relation with said second place of evaporation.

13. In a method of refrigeration which includes evaporation of refrigerant fluid in the presence of an auxiliary agent in a place of evaporation and absorption of refrigerant fluid out of the auxiliary agent into an absorbent in a place of absorption, that improvement which resides in circulating the auxiliary agent through and between said places of absorption and evaporation and evaporating liquid refrigerant in the presence of auxiliary agent from said place of absorption to precool auxiliary agent flowing to said place of evaporation.

14. In the art of refrigeration in which evaporation of liquid refrigerant takes place in the presence of inert gas at a first place of evaporation and gas flows from the place of evaporation to a place of absorption and back to the place of evaporation, the improvement which consists in conducting liquid to a second place of evaporation, flowing gas from the place of absorption to the second place of evaporation, transferring heat from gas flowing to the first place of evaporation to liquid in the second place of evaporation, and flowing gas from the second place of evaporation back to the place of absorption and in a path of flow which is out of heat exchange relation with the gas flowing from the first place of evaporation to the place of absorption.

15. In a method of refrigeration which includes circulating auxiliary agent through a first place of evaporation and evaporating refrigerant fluid into the auxiliary agent at such place of evaporation, the improvement which consists in evaporating refrigerant fluid into auxiliary agent at a second place of evaporation, flowing to the second place of evaporation auxiliary agent substantially free of auxiliary agent flowing from the first place of evaporation, and flowing auxiliary agent to the first place of evaporation in heat exchange relation with the second place of evaporation.

ROBERT E. LYFORD.